United States Patent
Fukushima (10) Patent No.: US 7,212,370 B1
(45) Date of Patent: May 1, 2007

(54) METHOD FOR REDUCING TIME LOSS DURING MANUFACTURE OF HARD DISK DRIVES BY PREDICTING REDUCTION IN HELIUM CONCENTRATION USING INSITU NON-REPEATABLE RUNOUT

(75) Inventor: Craig Fukushima, Monte Sereno, CA (US)

(73) Assignee: Hitachi Global Storage Technologies Amsterdam B.V., Amsterdam (NL)

( * ) Notice: Subject to any disclaimer, the term of this patent is extended or adjusted under 35 U.S.C. 154(b) by 0 days.

(21) Appl. No.: 11/329,745

(22) Filed: Jan. 10, 2006

(51) Int. Cl.
*G11B 21/02* (2006.01)

(52) U.S. Cl. .............. 360/75; 360/69; 702/51

(58) Field of Classification Search ............ None
See application file for complete search history.

(56) References Cited

U.S. PATENT DOCUMENTS

| | | | |
|---|---|---|---|
| 5,454,157 A | 10/1995 | Ananth et al. | |
| 6,144,178 A | 11/2000 | Hirano et al. | |
| 6,474,166 B1 | 11/2002 | Osawa et al. | |
| 6,560,064 B1 | 5/2003 | Hirano | |
| 6,567,235 B2 | 5/2003 | Kasetty et al. | |
| 6,646,821 B2 | 11/2003 | Bernett et al. | |
| 6,654,198 B2 | 11/2003 | Liu et al. | |
| 6,683,747 B2 | 1/2004 | Bernett | |
| 6,700,726 B1 | 3/2004 | Gillis et al. | |
| 6,765,379 B1 | 7/2004 | Marshall et al. | |
| 7,062,387 B1* | 6/2006 | Burns et al. | 702/51 |
| 2003/0026033 A1* | 2/2003 | Fioravanti et al. | 360/75 |
| 2005/0128628 A1* | 6/2005 | Han et al. | 360/75 |
| 2006/0023339 A1* | 2/2006 | Fukuyama et al. | 360/75 |

* cited by examiner

*Primary Examiner*—Andrew L. Sniezek (57) ABSTRACT

A method is presented for reducing time loss during manufacture and testing of a hard disk drive by predicting reduction in gas fill. The method includes using servo tracking error to obtain a measured value of insitu non-repeatable runout (NRRO) for the hard disk drive, the hard disk drive having been filled with the gas and semi-sealed. The measured value of NRRO is then deconvolved into a plurality of values for flow induced NRRO components. These values of NRRO and of flow induced NRRO components are compared to predetermined limiting values and a time when one of the predetermined limiting values will be reached is predicted. Action is then applied as appropriate.

21 Claims, 7 Drawing Sheets

METHOD FOR REDUCING TIME LOSS DURING MANUFACTURE OF HARD DISK DRIVES BY PREDICTING REDUCTION IN HELIUM CONCENTRATION USING INSITU NON-REPEATABLE RUNOUT

TECHNICAL FIELD

The present invention relates to the field of hard disk drives, and more particularly to a method for reducing time loss during manufacture and preventing data loss during operation of the hard disk drive by predicting reduction in gas fill pressure using insitu non-repeatable runout (NRRO).

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm with a suspended slider is utilized to reach out over the disk. The arm carries an assembly that includes a slider, a suspension for the slider and in the case of the load/unload drive, a nose portion for directly contacting the holding ramp during the unload cycle. The slider also includes a head assembly including a magnetic read/write transducer or head for reading/writing information to or from a location on the disk. The complete assembly, e.g., the suspension and slider, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Recently some disk drives are being filled with low-density gases other than air (i.e., helium) to enhance their performance. The lower density gas can reduce the aerodynamic drag between the disks and their read/write heads. This reduced drag can, in turn, reduce arm and suspension flutter and actuator buffeting. This reduced drag can also result in a reduction in power requirements for the spindle motor. The lower density gas also is more effective than air for conducting away heat generated during operation of the disk drive.

Unfortunately, in spite of the advantages associated with the low-density gas fill, these gas filled disk drives have associated problems that have impacted their commercial success. These problems are associated with a leaking of the gas from the disk drives over time. Data loss can occur if the gas fill becomes too low.

Additionally, during the manufacture of the low-density gas filled disk drives, the series of tests that are performed on the drives for quality assurance are frequently failing due to leakage of the helium. These tests are performed on disks that have been filled with helium and semi-sealed. These tests may take a period of days to complete, and if a failure occurs many hours into the test and the failure is due to loss of helium, the disk must be refilled and the test restarted, thereby resulting in a significant time loss.

SUMMARY

A method for reducing time loss during manufacture and testing of a hard disk drive by predicting reduction in gas fill is disclosed. The method includes using servo tracking error to obtain a measured value of insitu non-repeatable runout (NRRO) for the hard disk drive, the hard disk drive having been filled with the gas and semi-sealed. The measured value of NRRO is then deconvolved into a plurality of values for flow induced NRRO components. These values of NRRO and of flow induced NRRO components are compared to predetermined limiting values and a time when one of the predetermined limiting values will be reached is predicted. Action is then applied as appropriate.

DETAILED DESCRIPTION

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive (HDD) and components connected therewith. The discussion will then focus in particular on embodiments of a method for reducing time loss in the manufacturing and testing and data loss during the operation of hard disk drives by predicting reduction in gas fill pressure using insitu non-repeatable runout. For simplicity of discussion, in embodiments of the invention described below, the gas with which the hard disk drive is filled will be referred to as helium. However, it is understood that any suitable low-density gas other than air may be used.

In general, embodiments of the present invention provide for taking appropriate action prior to a loss of helium concentration that would be sufficient to result in a test failure during the manufacturing of a disk drive or data loss in a commercially operational disk drive. For example, since the filling of the disk drive with helium results in enhanced performance of the disk, the reduction in helium concentration can result in reduced performance of the disk. Therefore it is desirable to maintain sufficient pressure of the helium fill.

Embodiments of the present invention as discussed below include monitoring the HDD non-repeatable runout (NRRO) derived from the servo tracking error to estimate the adequacy of helium concentration onside of the HDD. The total NRRO and specific NRRO components such as disk, arm and suspension flutter and actuator air buffeting which are deconvolved from the total NRRO can be used as qualification metrics and also to estimate the helium concentration inside the HDD.

The magnitude of flow induced NRRO components such as disk, arm and suspension flutter in air and in helium medium have been shown experimentally to scale closely to the density or molecular weight ratio of helium to air. A historical record of flow induced NRRO component magnitudes can be used to estimate or project future magnitudes of flow induced NRRO and, by inference, helium concentration.

The current and/or projected future value of the total NRRO or selected components of NRRO (or implied helium concentration) can be used in the HDD manufacturing process to initiate immediate action such as rejection if the NRRO (or selected NRRO component) is too large, or if the helium concentration is at a level that may adversely affect the HDD reliability or performance (e.g., slider fly height). In a customer data application, the current and estimated future NRRO, as an estimate of helium concentration, can be used to initiate data maintenance action if predetermined thresholds are exceeded.

Figure 1:
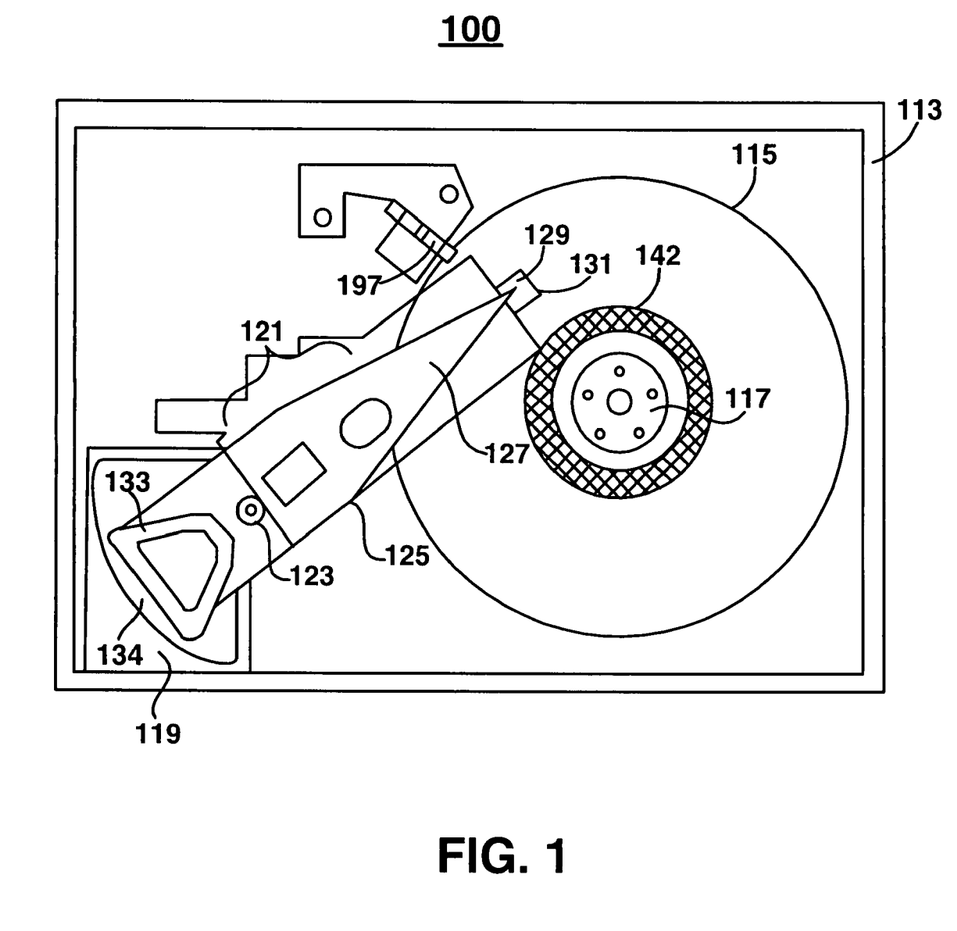
FIG. 1 is a schematic top plan view of a hard disk drive, in accordance with one embodiment of the present invention.

With reference now to FIG. 1, a schematic drawing of one embodiment of an information storage system comprising a magnetic hard disk file or drive (HDD) 100 for a computer system is shown. Embodiments of the invention are well suited for utilization on a plurality of hard disk drives. The utilization of the driver of FIG. 1 is merely one of a plurality of disk drives that may be utilized in conjunction with the present invention.

In the exemplary FIG. 1, HDD 100 has an outer housing or base 113 containing a disk pack having at least one media or magnetic disk 115. Once installed in drive 100, a spindle motor assembly having a central drive hub 117 rotates the disk or disks 115. An actuator comb 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115. It is understood that controller 119 controls the operation of the disk drive 100 and includes a servo that drives the spindle hub 117. During operation of disk drive 100, its ability to track properly is determined and a servo track error signal is provided via controller 119 for measuring such parameters as positional error and non-repeatable runout (NRRO).

In the embodiment shown, each arm 125 has extending from it at least one cantilevered ELS 127. It should be understood that ELS 127 may be, in one embodiment, an integrated lead suspension (ILS) that is formed by a subtractive process. In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as HDD 100. A magnetic read/write transducer 131 or head is mounted on a slider 129 and secured to a flexible structure called "flexure" that is part of ELS 127. The read/write heads magnetically read data from and/or magnetically write data to disk 115. The level of integration called the head gimbal assembly is the head and the slider 129, which are mounted on suspension 127. The slider 129 is usually bonded to the end of ELS 127.

ELS 127 has a spring-like quality, which biases or presses the air-bearing surface of the slider 129 against the disk 115 to cause the slider 129 to fly at a precise distance from the disk as the disk rotates and air bearing develops pressure. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator comb 121 by controller 119 causes the head gimbal assemblies to move along radial arcs across tracks on the disk 115 until the heads settle on their set target tracks. The head gimbal assemblies operate in a conventional manner and always move in unison with one another, unless HDD 100 uses multiple independent actuators (not shown) wherein the arms can move independently of one another.

Figure 2:
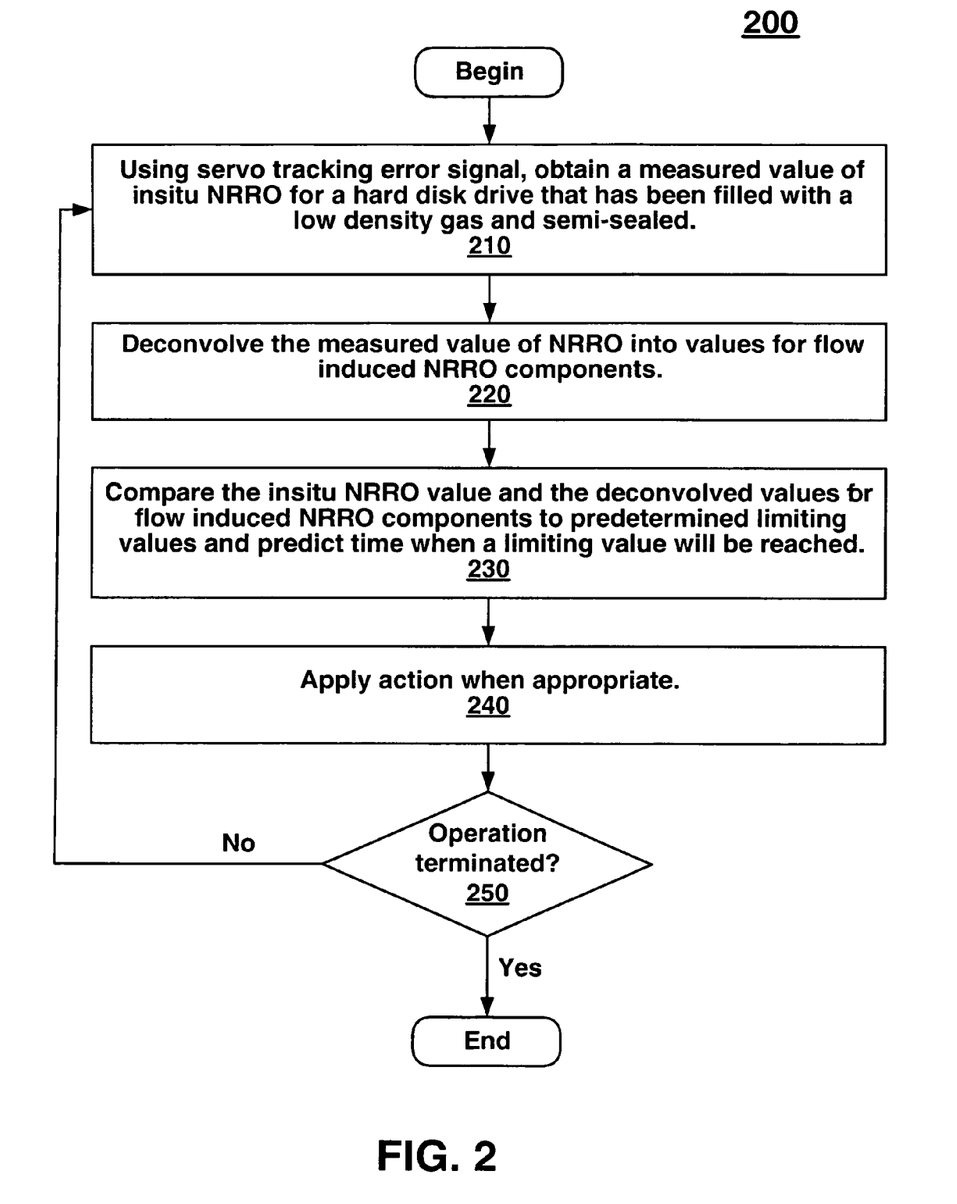
FIG. 2 is a flow chart of a method for reducing time loss during manufacture of hard disk drives in accordance with one embodiment of the present invention.

Referring to FIG. 2, a flow chart of a method 200 for reducing time loss during manufacture of hard disk drives (HDDs) is shown, in accordance with one embodiment of the present invention. During the manufacture of helium filled disk drives, the series of tests that are performed on the drives for quality assurance are frequently failing due to leakage of the helium. These tests are performed on disks that have been filled with helium and semi-sealed. These tests may take a period of days to complete, and if a failure occurs many hours into the test and the failure is due to loss of helium, the cause of the leak must be determined, the disk must be refilled and the test restarted, thereby resulting in a significant time loss. Method 200 provides a solution to reduce this time loss.

At step 210, according to one embodiment of the present invention, method 200 obtains a measured value of insitu NRRO from the servo tracking error signal provided to the controller (e.g., controller 119 of FIG. 1) for a hard disk drive, the hard disk drive having been filled with a low-density gas other than air, e.g., helium, and semi-sealed. The measured value may be obtained from any radial location, although a location at the outer diameter tends to obtain the most accurate results. To obtain a larger, more representative sample of data, the measured value of insitu NRRO may be obtained at a location near the outer diameter of the disk and also at a location near the mid point of the radius of the disk.

These measured values of insitu NRRO are comprised of a number of contributing components.

Figure 6:
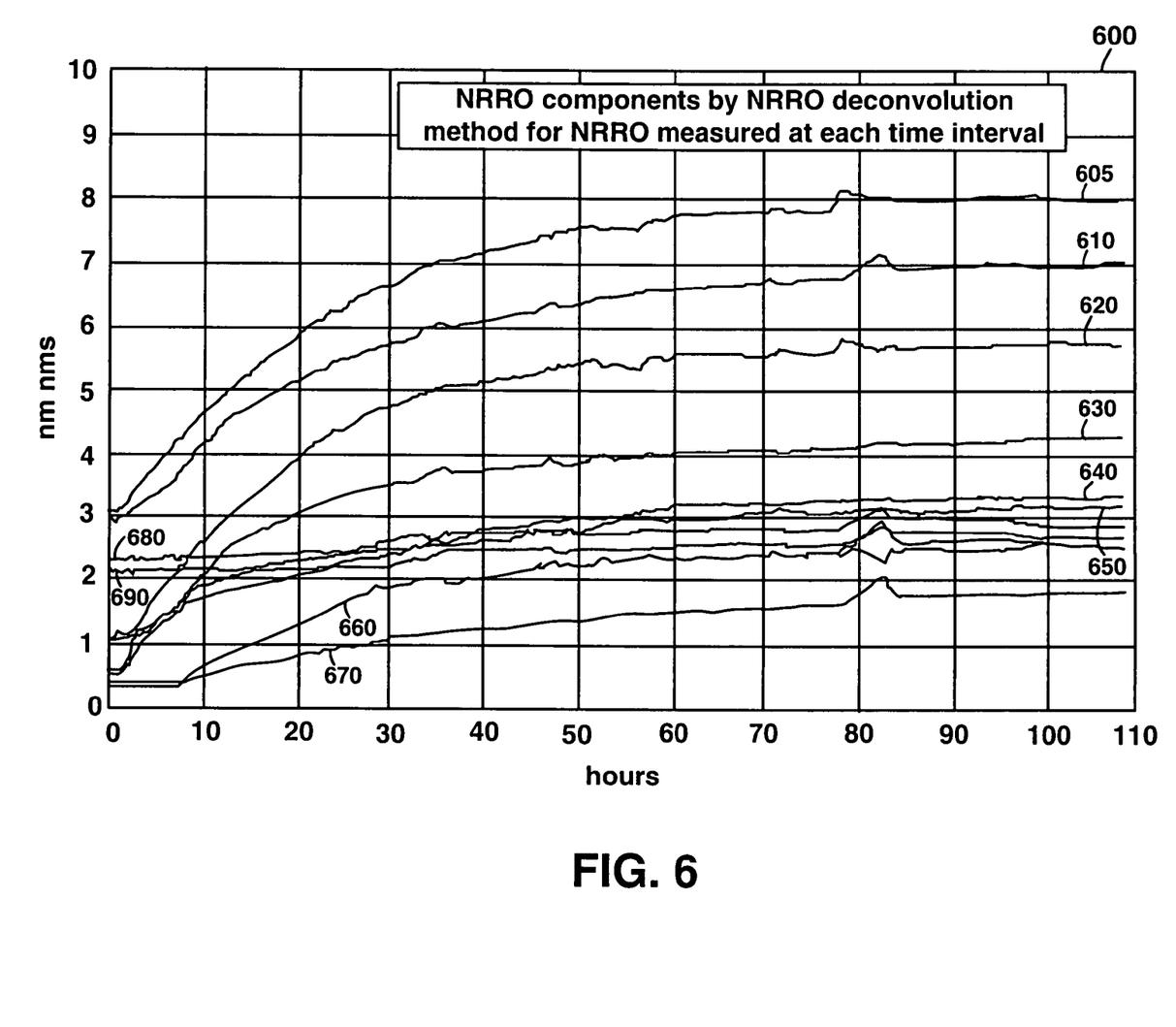
FIG. 6 is a graph illustrating typical insitu non-repeatable runout values deconvolved into flow induced component values.

At step 220 of method 200, according to one embodiment, the measured value on insitu NRRO is deconvolved into a plurality of values for flow induced NRRO components. These flow induced NRRO components can include such contributing factors as disk, arm and suspension flutter and actuator air-flow buffeting, all of which are sensitive to the density of the helium concentration and, thereby indicators of a change in helium pressure. Thus an indication of loss of helium pressure is inherently available to the HDD with no need for additional sensors or signals. Refer to FIG. 6 for a graph illustrating typical deconvolved root mean square values of total NRRO and NRRO components in nanometers.

At step 230 of FIG. 2, method 200 compares the insitu NRRO values and the deconvolved values for flow induced NRRO components to predetermined limiting values and predicts a time when one of the predetermined limiting values will be reached, in accordance with one embodiment of the present invention. These predetermined limiting values may be obtained by a number of methods. One such method could include pre-establishing a correlation of NRRO values as a function of various leak rates of helium concentration. The measured insitu NRRO values could then be compared to the established correlation and a time at which the reduction in helium concentration could reach an unacceptable level may be projected based on the pre-established correlation.

At step 240, in accordance with one embodiment of the present invention, once a helium leak is identified and the time at which an unacceptable level of helium concentration will be reached is determined, an action is applied as appropriate. In one embodiment, if the insitu NRRO or a flow induced component thereof is projected to reach a predetermined unacceptable magnitude during an operation, e.g., a self servowrite process during testing or writing data for an end-user application, the operation would be terminated. The cause for the helium leak could then be investigated, a repair implemented, and the operation restarted before a large amount of time elapses.

In another embodiment, if the time at which the reduction in gas fill is projected to reach a predetermined unacceptable level is projected to occur prior to the time for the operation to be completed, the operation would be terminated. Again, the cause for the helium leak could then be investigated, a repair implemented, and operation restarted before a large amount of time elapses.

In yet another embodiment, the semi-sealed hard disk drive can be refilled with the helium prior to final sealing when the value of insitu NRRO and/or one of its deconvolved flow-induced components reaches a predetermined unacceptable magnitude.

At step 250, according to one embodiment, method 200 checks whether the servo write process has terminated. If not, step 210 is re-entered and steps 210 through 240 are repeated. If the servo write process has terminated, method 200 is exited.

Figure 3:
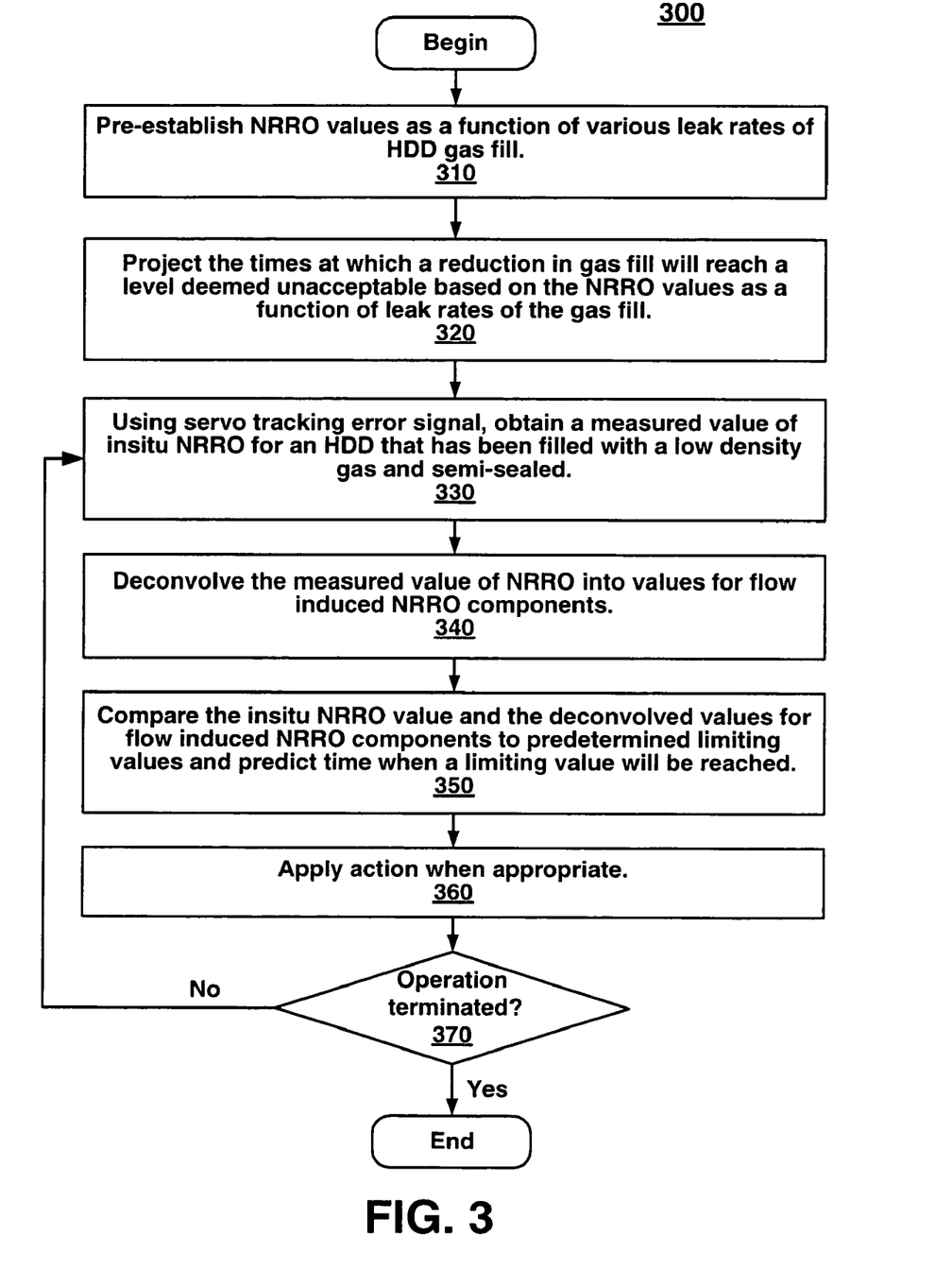
FIG. 3 is a flow chart of a method for reducing time loss during manufacture of hard disk drives in accordance with another embodiment of the present invention.

FIG. 3 is a flow chart of a method for reducing time loss during manufacture of hard disk drives in accordance with another embodiment of the present invention. During the manufacture of helium filled disk drives, the series of tests that are performed on the drives for quality assurance are frequently failing due to leakage of the helium. These tests are performed on disks that have been filled with helium and semi-sealed. These tests may take a period of days to complete, and if a failure occurs many hours into the test and the failure is due to loss of helium, the cause of the leak must be determined, the disk must be refilled and the test restarted, thereby resulting in a significant time loss. Method 200 provides a solution to reduce this time loss.

At step 310 of method 300, according to one embodiment of the present invention, a correlation of non-repeatable runout values as a function of a plurality of leak rates of helium concentration is pre-established. This correlation may be performed in a test environment using an exemplary HDD.

At step 320, the time at which a reduction in helium concentration is projected to reach a predetermined unacceptable level is determined based on the correlation, in accordance with one embodiment of the present invention.

At step 330, according to one embodiment of the present invention, method 300 obtains a measured value of insitu NRRO from the servo tracking error signal provided to the controller (e.g., controller 119 of FIG. 1) for a hard disk drive, the hard disk drive having been filled with a low-density gas other than air, e.g., helium, and semi-sealed. To obtain a larger, more representative sample of data, the measured value of insitu NRRO may be obtained at any location, although a location near the outer diameter of the disk tends to yield a more accurate result. An additional measurement may also be obtained at a location near the mid point of the radius of the disk. These measured values of insitu NRRO are comprised of a number of contributing components.

At step 340 of method 300, according to one embodiment, the measured value on insitu NRRO is deconvolved into a plurality of values for flow induced NRRO components. These flow induced NRRO components can include such contributing factors as disk, arm and suspension flutter and actuator air-flow buffeting, all of which are sensitive to the density of the helium fill and, thereby indicators of a change in helium pressure. Thus an indication of loss of helium pressure is inherently available to the HDD with no need for additional sensors or signals. Refer to FIG. 6 for a graph illustrating typical deconvolved root mean square values of total NRRO and NRRO components in nanometers.

At step 350 of FIG. 3, method 300 compares the insitu NRRO values and the deconvolved values for flow induced NRRO components to predetermined limiting values and predicts a time when one of the predetermined limiting values will be reached, in accordance with one embodiment of the present invention. These predetermined limiting values may be obtained by a number of methods. One such method could include obtaining a measurement of insitu NRRO with the hard disk drive being filled with air prior to filling with helium, deconvolving the NRRO into its flow induced components and using the magnitudes from this measurement as a reference for determining limiting values.

At step 360, in accordance with one embodiment of the present invention, once a helium leak is identified and the time at which an unacceptable level of helium concentration will be reached is determined, an action is applied as appropriate. In one embodiment, if the insitu NRRO or a flow induced component thereof is projected to reach a predetermined unacceptable magnitude during an operation, the operation would be terminated. The cause for the helium leak could then be investigated, a repair implemented, and operation restarted before a large amount of time elapses.

In another embodiment, if the time at which the reduction in gas fill is projected to reach a predetermined unacceptable level is projected to occur prior to the time for the operation to be completed, the operation would be terminated. Again, the cause for the helium leak could then be investigated, a repair implemented, and the operation restarted before a large amount of time elapses.

In yet another embodiment, the semi-sealed hard disk drive can be refilled with the helium prior to final sealing when the value of insitu NRRO and/or one of its deconvolved flow-induced components reaches a predetermined unacceptable magnitude.

At step 370, according to one embodiment, method 300 checks whether the servo write process has terminated. If not, step 330 is re-entered and steps 330 through 360 are repeated. If the servo write process has terminated, method 300 is exited.

Figure 4:
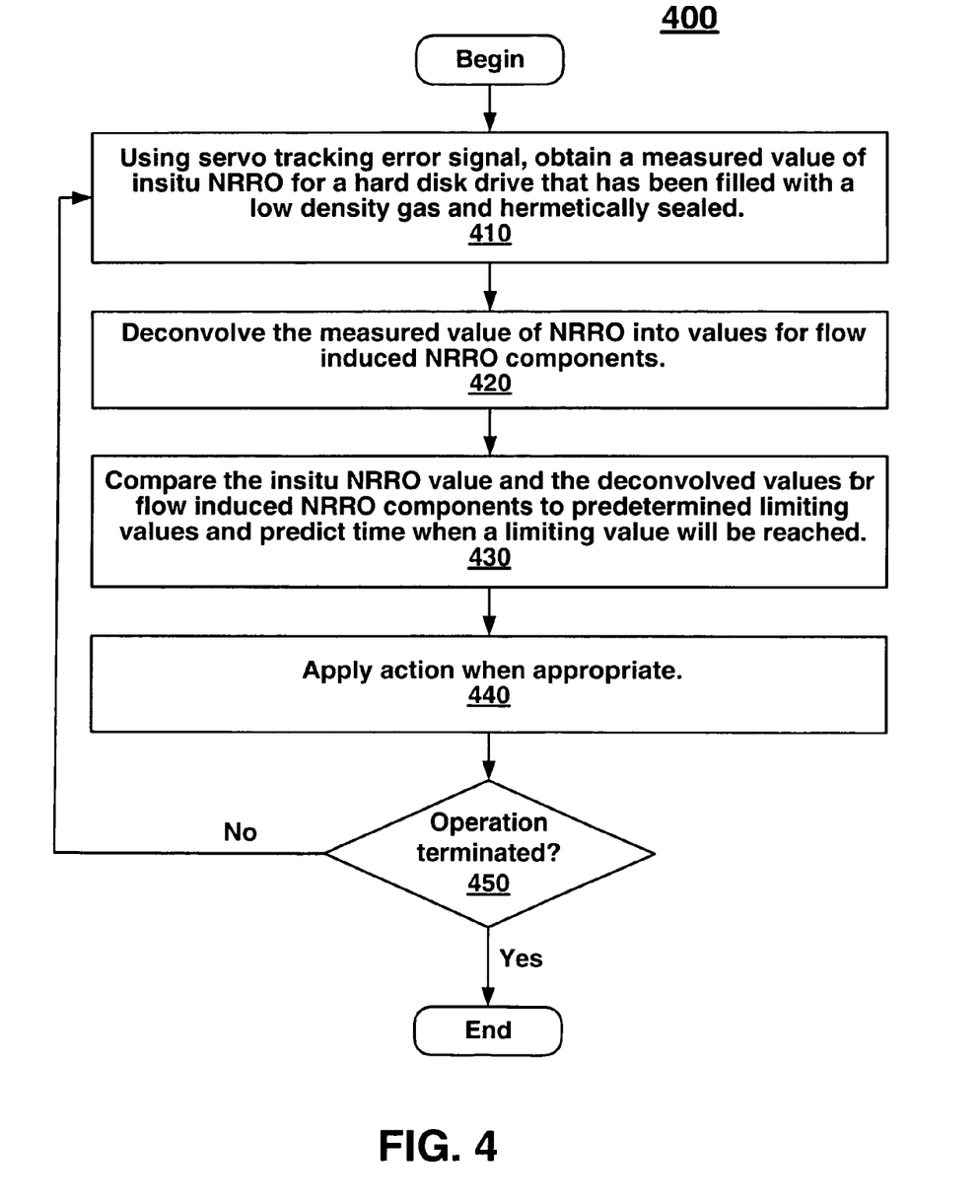
FIG. 4 is a flow chart of a method for preventing data loss during operation of hard disk drives in accordance with one embodiment of the present invention.

FIG. 4 is a flow chart of a method for preventing data loss during operation of hard disk drives in accordance with one embodiment of the present invention. Once the disks are filled with helium and tested, they are then further filled when deemed necessary and hermetically sealed. On rare occasions, a helium leak develops in a commercially operational HDD, sometimes resulting in a data loss. Method 400 provides a solution to prevent this data loss.

At step 410, according to one embodiment of the present invention, method 400 obtains a measured value of insitu NRRO from the servo tracking error signal provided to the controller (e.g., controller 119 of FIG. 1) for a hard disk drive, the hard disk drive having been filled with a low-density gas other than air, e.g., helium, and semi-sealed. To obtain a larger, more representative sample of data, the measured value of insitu NRRO may be obtained at, but not limited to a location near the outer diameter of the disk and also at a location near the mid point of the radius of the disk. These measured values of insitu NRRO are comprised of a number of contributing components.

At step 420 of method 400, according to one embodiment, the measured value on insitu NRRO is deconvolved into a plurality of values for flow induced NRRO components. These flow induced NRRO components can include such contributing factors as disk, arm and suspension flutter and actuator air-flow buffeting, all of which are sensitive to the density of the helium fill and, thereby indicators of a change in helium pressure. Thus an indication of loss of helium pressure is inherently available to the HDD with no need for additional sensors or signals. Refer to FIG. 6 for a graph illustrating typical deconvolved root mean square values of total NRRO and NRRO components in nanometers.

At step 430 of FIG. 4, method 400 compares the insitu NRRO values and the deconvolved values for flow induced NRRO components to predetermined limiting values and predicts a time when one of the predetermined limiting values will be reached, in accordance with one embodiment of the present invention. These predetermined limiting values may be obtained by a number of methods. One such method could include pre-establishing a correlation of NRRO values as a function of various leak rates of helium concentration. The measured insitu NRRO values could then be compared to the established correlation and a time at which the reduction in helium concentration could reach an unacceptable level may be projected based on the pre-established correlation.

At step 440, in accordance with one embodiment of the present invention, once a helium leak is identified and the time at which an unacceptable level of helium concentration will be reached is determined, an action is applied as appropriate. In one embodiment, an advisory message could be sent to the user sufficiently prior to a time at which the reduction in gas fill reaches a predetermined unacceptable level, recommending that preventive maintenance be performed.

In another embodiment, an operation would be terminated if a time at which the reduction in helium concentration reaches a predetermined unacceptable level occurs before preventive maintenance is performed.

At step 450, according to one embodiment, method 400 checks whether the servo write process has terminated. If not, step 410 is re-entered and steps 410 through 440 are repeated. If the servo write process has terminated, method 400 is exited.

Figure 5:
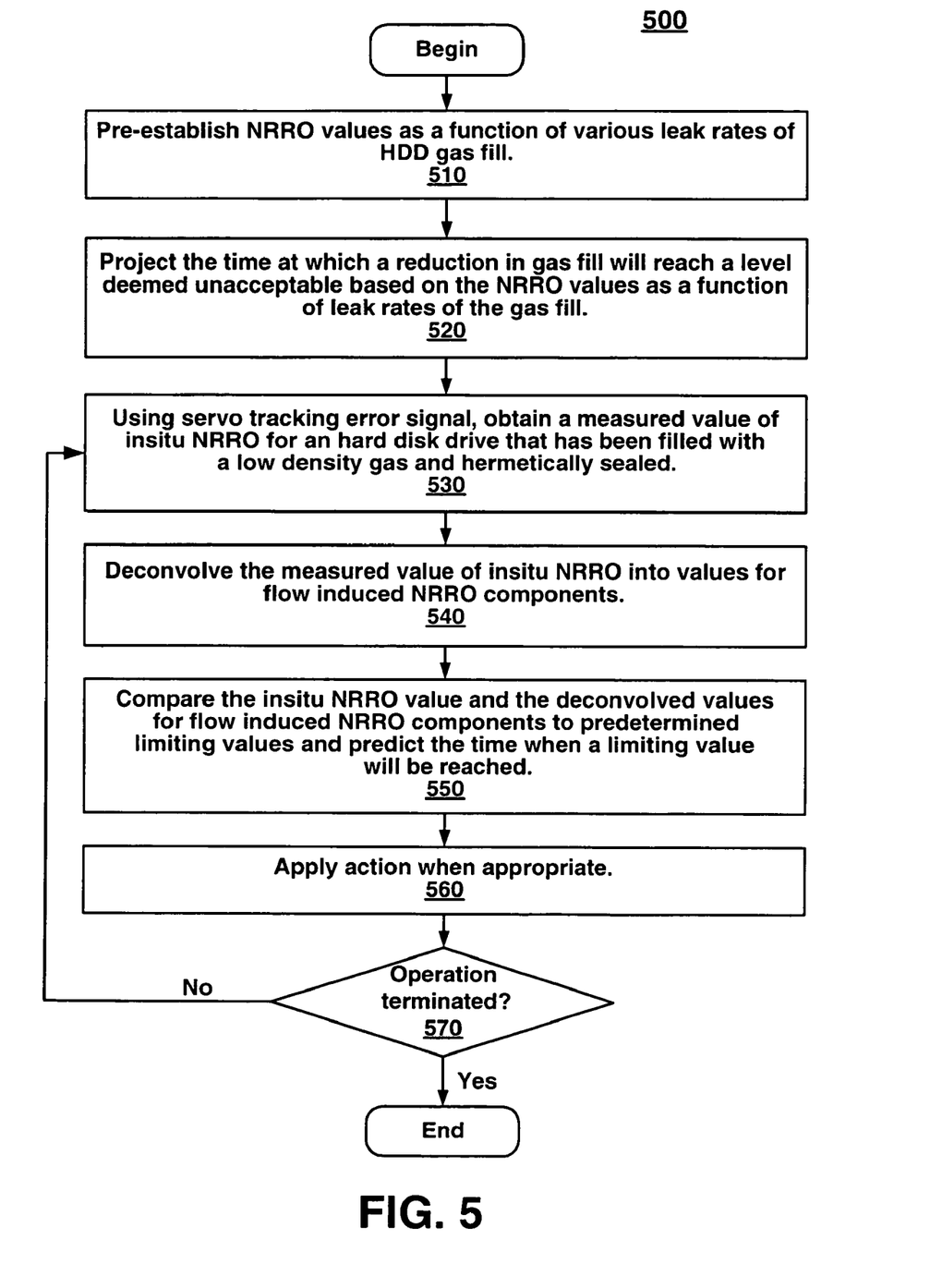
FIG. 5 is a flow chart of a method for preventing data loss during operation of hard disk drives in accordance with another embodiment of the present invention.

FIG. 5 is a flow chart of a method for preventing data loss during operation of hard disk drives in accordance with another embodiment of the present invention. Once the disks are filled with helium and tested, they are then further filled when deemed necessary and hermetically sealed. On rare occasions, a helium leak develops in a commercially operational HDD, sometimes resulting in a data loss. Method 500 provides a solution to prevent this data loss.

At step 510 of method 500, according to one embodiment of the present invention, a correlation of non-repeatable runout values as a function of a plurality of leak rates of helium concentration is pre-established. This correlation may be performed in a test environment using an exemplary HDD.

At step 520, the time at which a reduction in helium concentration is projected to reach a predetermined unacceptable level is determined based on the correlation, in accordance with one embodiment of the present invention.

At step 530, according to one embodiment of the present invention, method 500 obtains a measured value of insitu NRRO from the servo tracking error signal provided to the controller (e.g., controller 119 of FIG. 1) for a hard disk drive, the hard disk drive having been filled with a low-density gas other than air, e.g., helium, and semi-sealed. To obtain a larger, more representative sample of data, the measured value of insitu NRRO may be obtained at, but not limited to, a location near the outer diameter of the disk and also at a location near the mid point of the radius of the disk. These measured values of insitu NRRO are comprised of a number of contributing components.

At step 540 of method 500, according to one embodiment, the measured value on insitu NRRO is deconvolved into a plurality of values for flow induced NRRO components. These flow induced NRRO components can include such contributing factors as disk, arm and suspension flutter and actuator air-flow buffeting, all of which are sensitive to the density of the helium fill and, thereby indicators of a change in helium pressure. Thus an indication of loss of helium pressure is inherently available to the HDD with no need for additional sensors or signals. Refer to FIG. 6 for a graph illustrating typical deconvolved root mean square values of total NRRO and NRRO components in nanometers.

At step 550 of FIG. 5, method 500 compares the insitu NRRO values and the deconvolved values for flow induced NRRO components to predetermined limiting values and predicts a time when one of the predetermined limiting values will be reached, in accordance with one embodiment of the present invention. These predetermined limiting values may be obtained by a number of methods. One such method could include obtaining a measurement of insitu NRRO with the hard disk drive being filled with air prior to filling with helium, deconvolving the NRRO into its flow induced components and using the magnitudes from this measurement as a reference for determining limiting values.

At step 560, in accordance with one embodiment of the present invention, once a helium leak is identified and the time at which an unacceptable level of helium concentration will be reached is determined, an action is applied as appropriate. In one embodiment, an advisory message could be sent to the user sufficiently prior to a time at which the reduction in gas fill reaches a predetermined unacceptable level, recommending that preventive maintenance be performed.

In another embodiment, an operation would be terminated if a time at which the reduction in helium concentration reaches a predetermined unacceptable level occurs before preventive maintenance is performed.

At step 570, according to one embodiment, method 500 checks whether the servo write process has terminated. If not, step 530 is re-entered and steps 530 through 560 are repeated. If the servo write process has terminated, method 500 is exited.

FIG. 6 is a graph 600 illustrating typical insitu NRRO values deconvolved into flow induced component values versus time. In order to estimate the time constant, values for NRRO were obtained at regular intervals at two locations of the head on the disk, one at the outer diameter and one at a midpoint. For each NRRO component "X" (e.g., disk flutter, arm and suspension flutter, actuator buffeting), X was deconvolved vs. time. The data was then normalized to a steady state value $X_i/X_{final}$ where "i" is for each time interval. The data was next transformed into an inverted exponential decay function ($X_e = \log(1 - X_i/X_{final})$). A linear regression (order 1) was then performed for $X_e$.

Curves 605 and 610 are the total NRRO values for time intervals indicated taken at the outer diameter (OD) and midpoint (MD), respectively, as the arm moves across the disk surface. Curves 620 and 630 are deconvolved values of disk flutter vs. time, curve 620 taken at OD and curve 630 taken at MD. Curves 640 and 650 are actuator flutter values taken at OD and MD, respectively. Curve 660 shows arm and suspension flutter values at OD and curve 670 shows suspension flutter values at MD. Curves 680 and 690 are position error signals taken at OD and MD, respectively.

Figure 7:
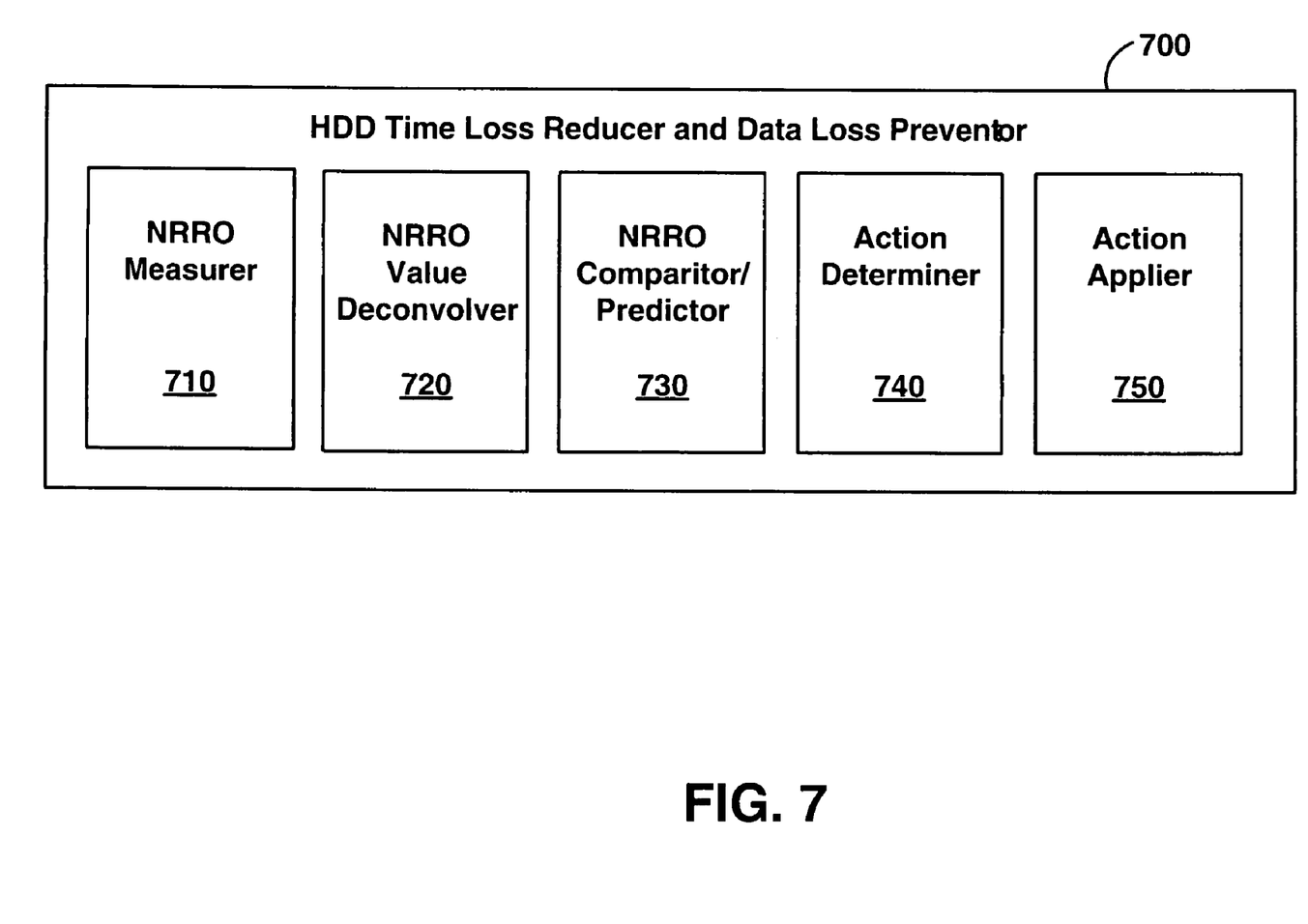
FIG. 7 is a block diagram of an HDD time loss reducer and data loss preventor, in accordance with one embodiment of the present invention.

Referring now to FIG. 7, a block diagram of an HDD time loss reducer and data loss preventor is shown, in accordance with one embodiment of the present invention. NRRO Measurer 710 is a NRRO measuring means for measuring insitu NRRO in a hard disk drive using servo track error signals. According to one embodiment of the present invention, NRRO Measurer 710 obtains a measured value of insitu NRRO from the servo tracking error signal provided to the controller (e.g., controller 119 of FIG. 1) for a hard disk drive that has been filled with a concentration of helium and semi-sealed in preparation for testing. To obtain a larger, more representative sample of data, the measured value of insitu NRRO may be obtained at, but not limited to, a location near the outer diameter of the disk and also at a location near the mid point of the radius of the disk. According to another embodiment, the hard disk drive is in commercial operation and has been tested and filled with a concentration of helium and hermetically sealed.

NRRO Value Deconvolver 720 is a value deconvolving means for deconvolving measured NRRO into flow-induced components, in accordance with one embodiment of the present invention. Refer to the discussion of FIG. 6 for an example of NRRO values and deconvolved flow induced NRRO component values.

According to one embodiment of the present invention, NRRO Comparitor/Predictor 730 provides a means for comparing measured insitu NRRO values and deconvolved flow-induced component values to predetermined limits and for predicting if and when one of the measured insitu NRRO values or deconvolved flow-induced component values would reach an appropriate one of the predetermined limits.

These predetermined limits may be obtained by a number of methods. In accordance with one embodiment, such a method might include pre-establishing a correlation of NRRO values as a function of various leak rates of helium concentration. The measured insitu NRRO values could then be compared to the established correlation and a time at which the reduction in helium concentration could reach an unacceptable level may be projected based on the pre-established correlation.

According to another embodiment, such a method for obtaining predetermined limits could include obtaining a measurement of insitu NRRO with the hard disk drive being filled with air prior to filling with helium, deconvolving the NRRO into its flow induced components and using the magnitudes from this measurement as a reference for determining limiting values.

Action Determinor 740 provides a means for determining an appropriate action based on input from the NRRO comparator/predictor, in accordance with embodiments of the present invention. In one embodiment, if the insitu NRRO or a flow induced component thereof is projected to reach a predetermined unacceptable magnitude during an operation, e.g., self servowrite process, during the manufacturing testing process for a semi-sealed HDD, the operation would be terminated. The cause for the helium leak could then be investigated, a repair implemented, and the operation restarted before a large amount of time elapses.

In another embodiment, during the manufacturing testing process for a semi-sealed HDD, if the time at which the reduction in gas fill is projected to reach a predetermined unacceptable level is projected to occur prior to the time for the operation to be completed, the operation would be terminated. Again, the cause for the helium leak could then be investigated, a repair implemented, and the operation restarted before a large amount of time elapses.

In yet another embodiment, in a semi-sealed HDD, the HDD can be refilled with the helium prior to final sealing when the value of insitu NRRO and/or one of its deconvolved flow-induced components reaches a predetermined unacceptable magnitude.

In still another embodiment, in a hermetically sealed, commercially operational HDD, an advisory message could be sent to the user sufficiently prior to a time at which the reduction in gas fill reaches a predetermined unacceptable level, recommending that preventive maintenance be performed.

In another embodiment, in a hermetically sealed, commercially operational HDD, an operation could be terminated if the time at which the reduction in helium concentration reaches a predetermined unacceptable level is reached before preventive maintenance is performed.

Action Applier 750, in turn, applies the appropriate action as determined by Action Determinor 740, according to embodiments of the present invention. Action Applier 750 sends advisory messages according to one embodiment. According to another embodiment, Action Applier 750 may terminate a servowrite process in accordance with Action Determinor's 740 determined action.

Thus, the present invention provides, in various embodiments, a method for reducing time loss during manufacture of hard disk drives by predicting reduction in helium pressure using insitu non-repeatable runout. The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for reducing time loss during manufacture and testing of a hard disk drive by predicting reduction in gas fill, said method comprising:
   using servo tracking error, obtaining a measured value of insitu non-repeatable runout for said hard disk drive, said hard disk drive having been filled with said gas and semi-sealed;
   deconvolving said measured value of non-repeatable runout into a plurality of values for flow induced non-repeatable runout components;
   comparing said insitu non-repeatable runout value and said deconvolved plurality of values for flow induced non-repeatable runout components to predetermined limiting values and predicting a time when one of said predetermined limiting values will be reached; and
   applying action as appropriate.

2. The method recited in claim 1 further comprising:
   obtaining said measured value of insitu non-repeatable runout for said hard disk drive for at least one location on the radius of said disk.

3. The method recited in claim 2 further comprising:
   pre-establishing a correlation for non-repeatable runout values as a function of a plurality of leak rates of said gas fill.

4. The method recited in claim 3 further comprising:
   projecting a time at which a reduction in gas fill will reach a predetermined unacceptable level based on said correlation.

5. The method recited in claim 4 wherein said applying action as appropriate further comprises:an operation when said time at which said reduction in gas fill reaches said predetermined unacceptable level occurs prior to the time for said operation to be completed.

6. The method recited in claim 1 wherein said applying action as appropriate further comprises:
   terminating an operation when said at least one of said measured value of insitu non-repeatable runout and said deconvolved flow induced non-repeatable runout components reaches a predetermined unacceptable magnitude.

7. The method recited in claim 1 wherein said applying action as appropriate further comprises:
   refilling said semi-sealed hard disk drive with said gas fill prior to final sealing when at least one of said value of insitu non-repeatable runout and said value of deconvolved flow-induced non-repeatable runout reaches a predetermined unacceptable magnitude.

8. The method recited in claim 1 wherein said deconvolving said measured value of non-repeatable runout into a plurality of values for flow-induced non-repeatable runout components further comprises:
   deconvolving said measured value of non-repeatable runout into values for arm and suspension flutter.

9. The method recited in claim 1 wherein said deconvolving said measured value of non-repeatable runout into a plurality of values for flow-induced non-repeatable runout components further comprises:
   deconvolving said measured value of non-repeatable runout into values for actuator air-flow buffeting.

10. A method for reducing time loss during manufacture and testing of a hard disk drive filled with a gas other than air by applying actions based on reduction in gas fill, said method comprising:
    pre-establishing a correlation of non-repeatable runout values as a function of a plurality of leak rates of said gas fill;
    projecting a time at which said reduction in gas fill reaches a predetermined unacceptable level based on said correlation;
    using servo tracking error, obtaining a measured value of insitu non-repeatable runout for said hard disk drive, said hard disk drive having been filled with said gas and semi-sealed;
    deconvolving said measured value of non-repeatable runout into a plurality of values for flow induced non-repeatable runout components;
    comparing said insitu non-repeatable runout value and said deconvolved plurality of values for flow induced non-repeatable runout components to predetermined limiting values and predicting a time when one of said predetermined limiting values will be reached; and
    applying action as appropriate.

11. The method recited in claim 10 further comprising:
    obtaining said measured value of insitu non-repeatable runout for said hard disk drive for at least one location on the radius of said disk.

12. The method recited in claim 10 wherein said applying action as appropriate further comprises:
    terminating an operation when said time at which said reduction in gas fill reaches said predetermined unacceptable level occurs prior to the time for said operation to be completed.

13. The method recited in claim 10 further comprising:
    preceding said pre-establishing a plurality of non-repeatable runout values as a function of leak rate of said gas fill with a measurement of insitu non-repeatable runout and deconvolved non-repeatable runout flow induced components in said hard disk drive, said hard disk drive being filled with air prior to filling with said gas.

14. The method recited in claim 13 further comprising:
    using magnitudes of said measurement as a reference for determining said predetermined unacceptable level.

15. The method recited in claim 10 wherein said applying action as appropriate further comprises:
    terminating an operation when said at least one of said measured value of insitu non-repeatable runout and said deconvolved flow induced non-repeatable runout components reaches a predetermined unacceptable magnitude.

16. The method recited in claim 10 wherein said applying action as appropriate further comprises:
    refilling said semi-sealed hard disk drive with said gas fill prior to final sealing when at least one of said value of insitu non-repeatable runout and said value of deconvolved flow-induced non-repeatable runout reaches a predetermined unacceptable magnitude.

17. The method recited in claim 10 wherein said deconvolving said measured value of non-repeatable runout into a plurality of values for flow-induced non-repeatable runout components further comprises:
    deconvolving said measured value of non-repeatable runout into values for arm and suspension flutter.

18. The method recited in claim 10 wherein said deconvolving said measured value of non-repeatable runout into a plurality of values for flow-induced non-repeatable runout components further comprises:

deconvolving said measured value of non-repeatable runout into values for actuator air-flow buffeting.

19. A hard disk drive comprising:

a semi-sealed housing containing a non-air low density gas; and means for reducing time loss during manufacture and testing of said hard disk drive, said means for reducing time loss comprising:

non-repeatable runout measuring means for measuring insitu non-repeatable runout in said hard disk drive using servo track error signals;

non-repeatable runout value deconvolving means for deconvolving said measured non-repeatable runout into a plurality of flow-induced components in said hard disk drive;

non-repeatable runout comparator/predictor means for comparing said measured insitu non-repeatable runout value and said plurality of deconvolved flow-induced component values to a plurality of predetermined limits and for predicting if and when one of said measured insitu non-repeatable runout value and said plurality of deconvolved flow-induced component values would reach an appropriate one of said plurality of predetermined limits;

action determining means for determining an appropriate action based on input from said non-repeatable runout comparator/predictor; and action applier means for applying said appropriate action.

20. The hard disk drive described in claim 19 wherein said appropriate action comprises terminating an operation when it is determined that one of said plurality of deconvolved component values will reach an appropriate one of said plurality of predetermined limits prior to the completion of said operation.

21. The hard disk drive described in claim 19 wherein said appropriate action comprises refilling said hard disk drive with said non-air low density gas when it is predicted that one of said plurality of deconvolved component values will reach an appropriate one of said plurality of predetermined limits prior to a final sealing process.

* * * * *